(12) United States Patent
Cui et al.

(10) Patent No.: US 8,897,237 B2
(45) Date of Patent: Nov. 25, 2014

(54) GRANTING SCHEDULING REQUESTS IN A WIRELESS COMMUNICATION SYSTEM

(75) Inventors: Ningzhou Cui, Fox Grove, IL (US); Frank F. Liang, Lisle, IL (US); Jiangnan Jason Chen, Hawthorn Woods, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 576 days.

(21) Appl. No.: 13/097,765

(22) Filed: Apr. 29, 2011

(65) Prior Publication Data
US 2012/0275391 A1 Nov. 1, 2012

(51) Int. Cl.
*H04W 4/00* (2009.01)
*H04W 72/12* (2009.01)

(52) U.S. Cl.
CPC ...... *H04W 72/1247* (2013.01); *H04W 72/1289* (2013.01)
USPC .......................................... 370/329; 370/313

(58) Field of Classification Search
None
See application file for complete search history.

(56) References Cited

U.S. PATENT DOCUMENTS

| | | | | |
|---|---|---|---|---|
| 2003/0117982 | A1* | 6/2003 | Minnick | 370/337 |
| 2007/0121542 | A1* | 5/2007 | Lohr et al. | 370/329 |
| 2007/0281708 | A1* | 12/2007 | Bakhuizen et al. | 455/450 |
| 2008/0051098 | A1 | 2/2008 | Rao | |
| 2009/0109917 | A1 | 4/2009 | Pajukoski et al. | |
| 2010/0232355 | A1* | 9/2010 | Richeson et al. | 370/328 |

FOREIGN PATENT DOCUMENTS

| | | |
|---|---|---|
| EP | 1781055 A2 | 5/2007 |
| EP | 1816883 A1 | 8/2007 |
| EP | 156402 A1 | 12/2008 |
| WO | 2008085959 A1 | 7/2008 |

OTHER PUBLICATIONS

3GPP TS 36.213—vol. 8.8.0—3rd Generation Partnership Project; Technical Specification Group Radio Access Network; Evolved Universal Terrestrial Radio Access (E-UTRA); Physical layer procedures (Release 8)—Sep. 2009—pp. 77.
3GPP TS 36.321—vol. 8.8.0—3rd Generation Partnership Project; Technical Specification Group Radio Access Network; Evolved Universal Terrestrial Radio Access (E-UTRA); Medium Access Control (MAC) protocol specification (Release 8)—Sep. 2009—pp. 47.
A. Tanenbaum et al : Operating Systems, Design and Implementation—Topics: Process scheduling techniques: round-robin, priority scheduling, multiple queues, shortest job first, policy-driven scheduling, two-level scheduling—Prentice-Hall, 1987, pp. 82-93.
U.S. Appl. No. 61/304,855, filed Feb. 16, 2010—pp. 25.
PCT International Search Report and Written Opinion for Application No. PCT/2012/034151 mail date Jul. 17, 2012.

* cited by examiner

*Primary Examiner* — David Oveissi
(74) *Attorney, Agent, or Firm* — Steven A. May (57) ABSTRACT

Embodiments include methods and apparatus for granting scheduling requests in a wireless communications system that includes an eNB, a plurality of UEs, and a public safety system. The eNB receives multiple scheduling requests from multiple UEs, where each of the scheduling requests indicates that a corresponding UE is requesting uplink data transmission resources. The eNB determines a priority value for each of the scheduling requests based on multiple scoring criteria, resulting in a plurality of priority values associated with the scheduling requests. The eNB transmits one or more scheduling request grants to a subset of the UEs, where the subset includes one or more UEs that are associated with one or more scheduling requests having relatively high priority values. In an embodiment, the multiple scoring criteria include information associated with a public safety activity (e.g., a user role, a jurisdictional coverage area, an incident type, and/or an application type).

18 Claims, 5 Drawing Sheets

GRANTING SCHEDULING REQUESTS IN A WIRELESS COMMUNICATION SYSTEM

TECHNICAL FIELD

Embodiments of the present invention generally relate to methods and apparatus implemented in a wireless communication system for granting scheduling requests made by mobile devices (e.g., user equipments or UEs) to base stations (e.g., Node Bs or evolved Node Bs (eNBs)).

BACKGROUND

In systems based on a 3GPP LTE (Long Term Evolution) standard, user equipments (UEs) negotiate with the infrastructure (e.g., with evolved NodeBs, or eNBs) in order to transmit uplink data. To initiate such a negotiation, a UE transmits a Scheduling Request (SR) to an eNB. The UE may transmit an SR when the UE actually has uplink data to transmit, or the UE may transmit an SR periodically, regardless of whether or not the UE has data to transmit. After receiving an SR, the eNB may grant the SR by transmitting an SR grant to the UE. The SR grant indicates to the UE that the eNB is providing resources for the UE to transmit additional information, including information indicating the amount of uplink data that the UE has to transmit. Upon receiving an SR grant, the UE transmits the eNB an indication of the amount of uplink data in the form of a Buffer Status Report (BSR). Assuming sufficient system resources (e.g., resource blocks or RBs) are available for the UE to transmit that amount of uplink data, the eNB may transmit an uplink assignment to the UE. The uplink assignment indicates the system resources that the eNB has assigned to the UE (e.g., transmission parameters and an indicator of the quantity of data that the UE may transmit). Upon receiving the uplink assignment, the UE may initiate transmission of the data using the assigned resources.

At times, multiple UEs in a cell or sector may transmit SRs to an eNB during a same subframe. When sufficient downlink resources (e.g., resource blocks) are available for the eNB to transmit SR grants to all of the requesting UEs, the eNB may grant each of the multiple SRs (e.g., the eNB may transmit SR grants to each of the UEs). However, when sufficient downlink resources are not available for the eNB to transmit SR grants to all of the requesting UEs, conventional eNBs may either ignore or discard some of the SRs.

In some cases, a UE may have particularly time sensitive and important uplink data that the UE needs to transmit. Unfortunately, however, conventional eNBs generally lack the ability to consider the importance of uplink data when deciding which SRs the eNB will grant or ignore. Accordingly, conventional systems may impose undesirably large latencies on time sensitive and important uplink data that a UE desires to transmit to the system. Thus, what are needed are methods and apparatus for wireless communication systems to grant SRs in a more intelligent manner.

BRIEF DESCRIPTION OF THE DRAWINGS

Embodiments of the present invention will hereinafter be described in conjunction with the following drawing figures, wherein like numerals denote like elements.

DETAILED DESCRIPTION

The following acronyms may be used in this description:
3GPP—Third Generation Partnership Project
AF—Application Function
BSR—Buffer Status Report
CAD—Computer-Aided Dispatch
CDMA—code division multiple access
CQI—Channel Quality Indicator
DS-CDMA—Direct Sequence spread spectrum
eNode B or eNB—evolved Node B (LTE base station)
E-UTRA—Evolved Universal Terrestrial Radio Access (also known as E-UTRAN)
E-UTRAN—Evolved UMTS Terrestrial Radio Access Network (also known as E-UTRA)
FDMA—Frequency Division Multiple Access
FG—Fire Ground
FH—Frequency-Hopping
FTP—File Transfer Protocol
GPRS—General Packet Radio Service
GSM—Global System for Mobile communications (or Groupe Special Mobile)
HSS—Home Subscriber Server
IEEE—Institute for Electrical and Electronics Engineers
JCA—Jurisdictional Coverage Area
LTE—Long Term Evolution of UTRAN (E-UTRAN)
MC—Multi-Carrier
MME—Mobility Management Entity
MPTT—Mobile PTT
ms—milliseconds
Node B—base station
OFDM—Orthogonal Frequency Division Multiplexing
OFDMA—Orthogonal Frequency Division Multiple Access
OFHMA—Orthogonal Frequency-Hopping Multiple Access
PCRF—Policy and Charging Rules Function
PDCCH—Physical Downlink Control Channel
PDN—Public Data Network
PHR—Power Headroom Report
PSAP—Public Safety Answering Point
PSS—Public Safety System
PTT—Push-To-Talk
PUCCH—Physical Uplink Control Channel
PUSCH—Physical Uplink Shared Channel
QCI—QoS Class Identifier
QoS—Quality of Service
RB—Resource Block
RF—Radio Frequency
RSRP—Reference Signal Received Power
SAE—System Architecture Evolution
SCDMA—Synchronous Code Division Multiple Access
SC-FDMA—Single-Carrier FDMA
SOFDMA—Scalable OFDMA
SR—Scheduling Request
TCP—Transmission Control Protocol TD—Time Division
TDMA—Time Division Multiple Access
UE—User Equipment (e.g., a mobile station or mobile terminal)
UL—uplink (UE to Node B or eNB)
UMTS—Universal Mobile Telecommunications System
UTRAN—Universal Terrestrial Radio Access Network
VoIP—Voice over Internet Protocol
WDMA—Wavelength Division Multiple Access
W-CDMA—Wideband CDMA Although certain terms commonly associated with a particular type of wireless communication system may be used in the description and claims, it is to be understood that any such term should be interpreted broadly, and not in a manner that limits an interpretation of the scope of the claims to implementation within any particular type of communication system. For example, in a system based on a 3GPP LTE standard, the term "UE" is commonly used to refer to a wireless communication device, and an analogous device in another type of system may be referred to as a "mobile station," a "mobile terminal," a "mobile data terminal," a "mobile data computer," a "subscriber," or other type of device. Similarly, in 3GPP LTE, the term "evolved NodeB" (or eNB) is commonly used to refer to an infrastructure device that may be referred to in other systems as a base station or other type of device. Although the terms "UE" and "eNB" are used throughout the description and claims, these terms should be interpreted to include any type of wireless communication device or base station, respectively, that may be used in any of a variety of wireless communication systems. For example, but not by way of limitation, alternate embodiments may including systems that are based on other 3GPP standards, 3GPP2 standards, IEEE standards, GSM/GPRS standards, or other communications standards. Such alternate embodiments may use any of a variety of channel access methods, including but not limited to CDMA (e.g., W-CDMA, TD-CDMA, TD-SCDMA, DS-CDMA, FH-CDMA, OFHMA, MC-CDMA), FDMA (e.g., OFDMA, SOFDMA, WDMA, SC-FDMA), TDMA (e.g., MF-TDMA and STDMA), OFDM, and SDMA, or other methods.

Embodiments include methods and apparatus for granting scheduling requests (SRs) in a wireless communications system. A particular embodiment includes an evolved NodeB (eNB) receiving multiple SRs from multiple user equipments (UEs), the eNB prioritizing the SRs based on multiple scoring criteria, and the eNB transmitting SR grants to a subset of the multiple UEs associated with relatively high priority SRs. Details of this and other embodiments will be discussed further below.

Embodiments may be used in the context of various types of systems. For example, an embodiment discussed below is used in a wireless communication system that is configured to support communications with mobile user communication devices operated by public safety personnel (e.g., policemen, firemen, and so on). As will be discussed further below, the wireless communication system includes a public safety system, a plurality of UEs, and an infrastructure for providing wireless communications with the UEs (e.g., according to a 3GPP LTE standard). It is to be understood that other embodiments may be implemented in different types of systems. For example, but not by way of limitation, embodiments may be implemented in systems that support communications with wireless communication devices that are unmanned (e.g., devices affixed to parking meters, traffic lights, cameras, and sensors), or with wireless communication devices that are operated by other types of individuals, including but not limited to, taxicab operators, fleet vehicle operators, couriers, field service technicians, site personnel, military personnel, security personnel, medical personnel, and other individuals that are associated or not associated with a particular group or organization. In addition, in lieu of a public safety system, embodiments of a wireless communication system alternatively may include other types of dispatch systems, fleet control systems, incident response systems, military or civilian communications systems, monitoring systems, and data collection systems, to name a few. Accordingly, although a particular example embodiment is discussed below of a wireless communication system that includes a public safety system and a wireless system based on a 3GPP LTE standard, the example embodiment is not meant to limit interpretation of the scope of the inventive subject matter only to that embodiment.

Figure 1:
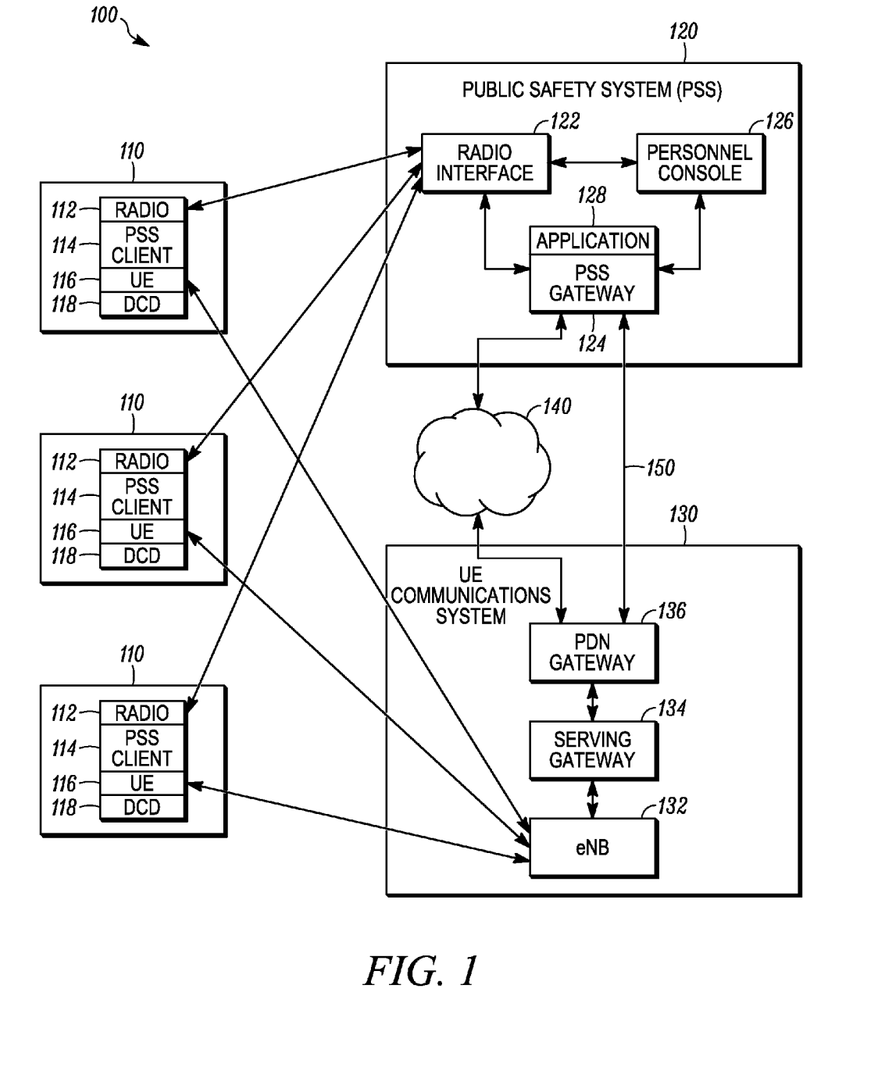
FIG. 1 is a simplified block diagram of wireless communication system, in accordance with an example embodiment.

FIG. 1 is a simplified block diagram of wireless communication system 100, in accordance with an example embodiment. System 100 includes a plurality of user communication devices 110, a public safety system 120 (PSS), and a UE communications system 130. According to an embodiment, wireless communication system 100 is configured to enable the user communication devices 110 to establish communications with both PSS 120 and the UE communications system 130, and to upload/download information (e.g., video data, image data, text, graphical content, voice data, and so on) to/from PSS 120 using high bandwidth communications provided by the UE communications system 130. In addition, PSS 120 and UE communications system 130 may communicate with each other via a network 140 (e.g., the Internet or another network) or via a direct connection 150.

For example, but not by way of limitation, user communication devices 110 may include handheld devices, devices installed in a vehicle, devices installed on headgear, and/or devices installed in a fixed location. A particular user communication device 110 may be completely self-contained (e.g., all components are included in a single housing), or a particular user communication device 110 may include various distinct components that communicate through wired connections and/or through a personal-, local-, or wide-area network. According to an embodiment, each user communication device 110 may include a radio 112 for communicating with the PSS 120, a UE 116 for communicating with the UE communications system 130, and one or more data capture devices 118 (DCD). In addition, although not illustrated, a user communication device 110 also may include a processing system, memory (e.g., RAM, ROM, hard drive, and so on), a user interface (e.g., including a microphone, speaker, display device, keyboard, cursor control device, and so on), and/or a wired or wireless modem for communicating between various components of the user communication device 110. The processing system may be integrated with one or both of radio 112 and UE 116, and/or may be a separate component that is shared by radio 112 and UE 116. Although only three user communication devices 110 are shown in FIG. 1, it is to be understood that wireless communication system 100 may include a multitude of user communication devices 110.

Radio 112 includes a two-way radio that provides bi-directional communications between a user communication device 110 and PSS 120, in an embodiment. Radio 112 may provide full-duplex and/or half-duplex, radio frequency (RF) communications between user communication device 110 and PSS 120, in various embodiments. For example, according to an embodiment, radio 112 may support half-duplex operations in which a Push-To-Talk (PTT) function is implemented. Radio 112 (and radio interface 122 in PSS 120) enables a user of the user communication device 110 to communicate verbally with a dispatcher or other personnel at personnel console 126 of PSS 120 (e.g., a user may initiate voice transmission in a PTT manner by depressing a button, and may receive voice transmissions from a dispatcher when the button is not depressed). Accordingly, via interaction with radio 120, the user of a user communication device 110 may initiate an incident response with a dispatcher at the PSS 120, may receive dispatch instructions from a dispatcher at the PSS 120, and/or the user and dispatcher may otherwise communicate during the course of an incident response (or at other times).

Besides voice communications, other information also may be communicated between user communication device 110 and PSS 120 using radio 112 and radio interface 122. For example, as will be explained in more detail later, user communication device 110 may execute one or more instances of a PSS client 114. The PSS client 114 may register with PSS 120 through messages communicated via radio 112 and radio interface 122. In conjunction with registration or otherwise, additional data also may be communicated through radio 112 and radio interface 122.

DCD 118 may be any of a number of types of devices configured to produce digital information, including but not limited to a still camera, a video camera, an audio capture device, a data capture device (e.g., for capturing vehicle operation data), or a combination thereof. Such devices may be particularly beneficial, for example, to capture images and other data associated with an incident response (e.g., a traffic stop, an emergency response, and so on). Data captured by DCD 118 may be stored in memory (not illustrated) of the user communication device 110. In addition or alternately, and as will be explained in more detail later, data captured by DCD 118 may be communicated via UE 116 and UE communications system 130 to a personnel console 126 at PSS 120, thus providing a dispatcher or other personnel with information a near real-time basis. In addition, the PSS 120 may cause video and/or other data received from a first user communication device 110 to be distributed to one or more other user communication devices 110 via UE communications system 130, thus enabling the other user communication devices 110 to render the video and/or other data to other users (e.g., other incident responders).

UE 116 includes a wireless communication device that provides the capability for the user and/or the user communication device 110 to communicate with eNB 132. According to an embodiment, UE 116 communicates with eNB 132 according to a 3GPP LTE standard, although UE 116 may communicate according to other specifications, as well. For example, but not by way of limitation, UE 116 may transmit voice, video, and/or other data to eNB 132 through an uplink channel between UE 116 and eNB 132. Transmitted data may include data generated by DCD 118 and/or data stored in memory (not illustrated) of user communication device 110. In addition, UE 116 may receive voice, video, and/or other data from eNB 132 through a downlink channel between eNB 132 and UE 116.

PSS 120 includes radio interface 122, PSS gateway 124, and one or more personnel consoles 126, in an embodiment. According to an embodiment, PSS 120 may include a Public Safety Answering Point (PSAP) and/or a Computer Aided Dispatch (CAD) system. Accordingly, PSS 120 may be equipped to answer and respond to calls from users of user communication devices 110 (e.g., policemen, firemen, and so on), and/or calls from individuals to an emergency telephone number or other dispatch-related telephone number (e.g., calls requesting police, firefighting, and ambulance services, among other things). Such calls may be received by a trained dispatcher working at personnel console 126, for example.

According to an embodiment, personnel console 126 includes a user interface (e.g., a keyboard, cursor control device, and so on), a monitor for displaying text, graphics, and images (e.g., video streams or other information received from user communication devices 110), audio communications equipment for facilitating bi-directional communications with callers and/or users of user communication devices 110, a processing system (e.g., a computer), and interfaces for communicating with radio interface 122, PSS gateway 124, a cellular and/or landline telephone system, and/or an external network (e.g., the Internet or another network). For example, when a call to an emergency telephone number is received at PSS 120, a dispatcher working at personnel console 126 may dispatch emergency services by communicating with an incident responder (e.g., a user of a user communication terminal 110) via personnel console 126, radio interface 122, and radio 112. Alternatively, when a call from a user of a user communication terminal 110 is received (via radio 112, radio interface 122, and personnel console 126), the dispatcher may dispatch additional incident responders. In addition to taking action based on initial calls, the dispatcher also may conduct additional communication with callers and/or users of user communication devices 110 in the course of an incident response. Such communication may include, for example, providing verbal instructions or information, and/or coordinating the provision of data (e.g., text, images, video, or other content).

In conjunction with providing communications between a dispatcher or other personnel at a personnel console 126 and a user at a user communication device 110, one or more software applications 128 may be executed on PSS gateway 124 and/or personnel console 126. The software applications 128 may include, for example, video processing applications, image processing applications, audio processing applications, data processing applications, and so on. According to an embodiment, the applications may produce data packets for provision to user communication terminals 110 (via PSS gateway 124, UE communications system 130, and UE 116), and or the applications may process data packets received from user communication terminals 110 (via UE 116, UE communications system 130, and PSS gateway 124).

As mentioned above, radio interface 122 provides for two-way communication with radios 112 of user communication devices 110. Radio interface 122 may implement a PTT communications protocol, in an embodiment (e.g., a dispatcher may initiate voice transmission in a PTT manner by depressing a button at personnel console 126, and may receive voice transmissions from a user of a user communication device 110 when the button is not depressed). Radio interface 122 digitizes analog RF signals received from radios 112, and provides the digital information to one or more personnel consoles 126 and/or PSS gateway 124. In addition, radio interface 122 may receive information from one or more personnel consoles 126 and/or PSS gateway 124, convert those signals to RF signals, and transmit the RF signals to one or more radios 112 of the user communication devices 110.

PSS gateway 124 provides connectivity between personnel console 126 and/or radio interface 122 and other external packet data networks (e.g., network 140 and/or UE communications system 130). In addition to transferring user data packets between PSS 120 and other networks, PSS gateway 124 may perform various other functions that include packet filtering and screening, and policy enforcement, among other things.

According to an embodiment, UE communications system 130 implements a 3GPP LTE standard, as mentioned previously. UE communications system 130 includes one or more enhanced NodeBs 132 (eNBs), a serving gateway 134, and a Public Data Network (PDN) gateway 136, according to an embodiment. In addition, although not illustrated, UE communications system 130 also may include a Mobility Management Entity (MME), a Home Subscriber Server (HSS), a Policy and Charging Rules Function (PCRF), and an Application Function (AF), among other things. According to a specific embodiment, UE communications system 130 may have an architecture that is based on the System Architecture Evolution (SAE) core network architecture (i.e., an evolution of the GPRS core network). In other embodiments, UE communications system 130 may implement a different communication standard and/or may have a different core network architecture. Once again, the description herein should not be used to limit interpretation of the inventive subject matter only to a system that implements a 3GPP LTE standard, and/or to a system that has an SAE core network architecture.

eNBs 132 communicate wirelessly with user communication devices 110, and more specifically, with UEs 116 of the user communication devices 110. According to an embodiment, uplink communications (i.e., communications in the direction from the user communication device 110 to the eNB 132) are performed using SC-FDMA, and downlink communications (i.e., communications in the direction from the eNB 132 to the user communication device 110) are performed using OFDMA. In other embodiments, other protocols may be used to provide communications between the user communication devices 110 and the eNB 132.

Information that an eNB 132 receives from a UE 116 ultimately may be destined for PSS 120. Similarly, PSS 120 may provide information to UE communications system 130 that is ultimately destined for a UE 116. According to an embodiment, information may be exchanged between eNB 132 and PSS gateway 124 (of PSS 120) via serving gateway 134 and PDN gateway 136. Accordingly, PSS gateway 124, serving gateway 134, and PDN gateway 136 constitute an interface between the PSS 120 and the eNB 130, which is configured to enable the eNB 130 to receive the information associated with a public safety activity from the PSS 120.

In an eNB 132, user data (e.g., voice, video or other data originating from or destined for a user communication device 110) is communicated in the form of user data packets. eNB 132 may provide user data packets to and/or receive user data packets from serving gateway 134. Serving gateway 134 routes and forwards user data packets, and may also perform functions relating to eNB handovers, and providing mobility between 3GPP LTE and other 3GPP technologies, among other things.

PDN gateway 136 provides connectivity between serving gateway 134 and other external packet data networks (e.g., network 140 and/or PSS 120). In addition to transferring user data packets between UE communications system 130 and other networks, PDN gateway 136 may perform various other functions that include packet filtering and screening, policy enforcement, and providing mobility between 3GPP and non-3GPP technologies, among other things.

As mentioned above, embodiments include methods and apparatus for granting scheduling requests (SRs) in a wireless communications system (e.g., system 100). An SR represents a request from a UE (e.g., UE 116) to transmit data to an eNB (e.g., eNB 132). On some occasions, multiple UEs may transmit SRs to an eNB simultaneously (e.g., during a particular communication subframe). In some cases, the eNB may determine that there are insufficient system resources for granting all of the received SRs. Some eNB implementations may simply ignore some of the SRs based on Quality-of-Service (QoS) indicators. However, in a public safety context, SR filtering based only on QoS may be undesirable, because data from some UE may be related to a high-priority incident, and it may be important to communicate that data to a PSS (e.g., PSS 120) rapidly, regardless of the channel quality between the UE and the eNB. Accordingly, filtering SRs based only on QoS may result in untimely communication of important data from the UE to the eNB (and ultimately to the PSS 120). This may hinder the ability of the PSS personnel to respond exigently to an incident.

Embodiments include methods and apparatus for prioritizing SRs (e.g., arranging SRs in order of priority), and granting the highest priority SRs (within the limits of the available resources). The SR prioritization procedures take into account multiple scoring criteria, including criteria that are unique to public safety systems and criteria that are not unique to public safety systems, in an embodiment. For example, but not by way of limitation, SR prioritization may take into account criteria selected from a group consisting of an indication of QoS between a UE and an eNB, a UE transmit time interval, a known quantity of data to be transmitted by the UE, whether or not a UE periodically transmits a scheduling request, a channel quality indicator (CQI), a reference signal received power (RSRP) indicator, and one or more public safety activity characteristics (e.g., a user role, a jurisdictional coverage area (JCA), an incident type, and/or an application type). SR scheduling using sets of the above criteria may enable embodiments to improve the maximum data throughput for the communication system, and/or may facilitate reductions in average response times, when compared with other systems in which such embodiments are not implemented.

Figure 2:
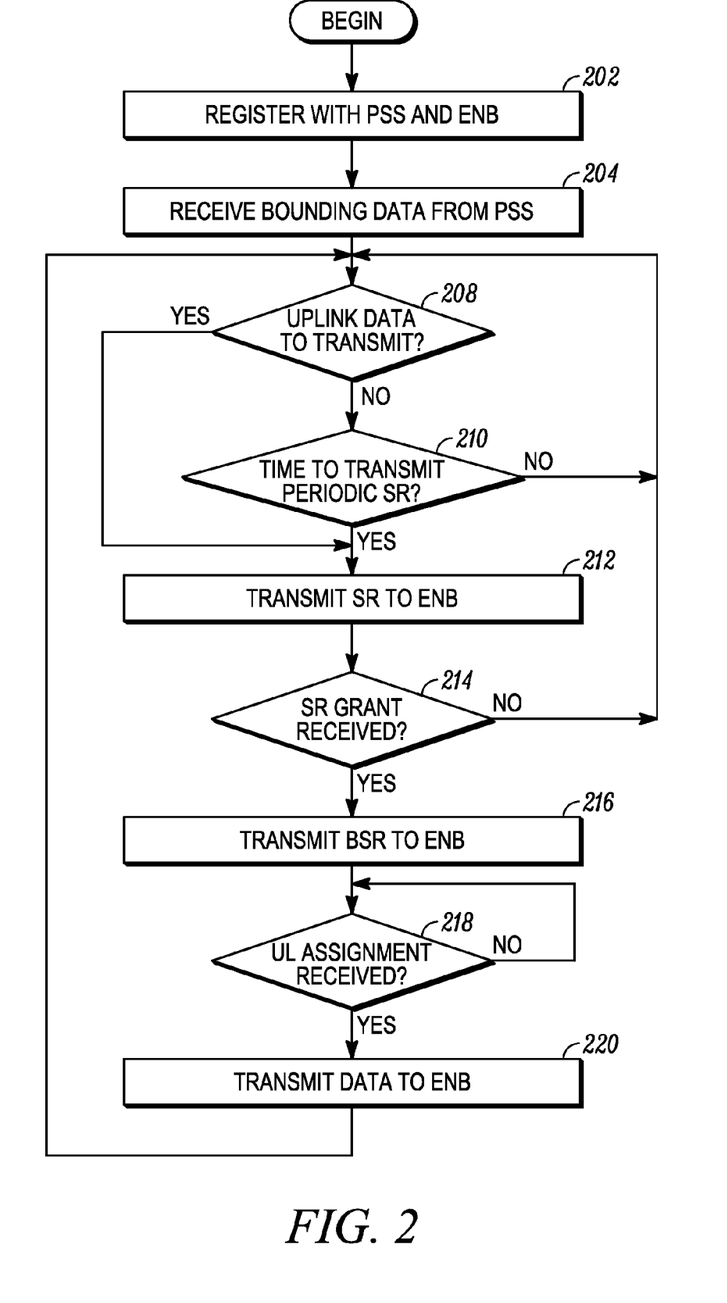
FIG. 2 is a flowchart of a method for a UE to upload data to a wireless communication system, in accordance with an example embodiment.
Figure 3:
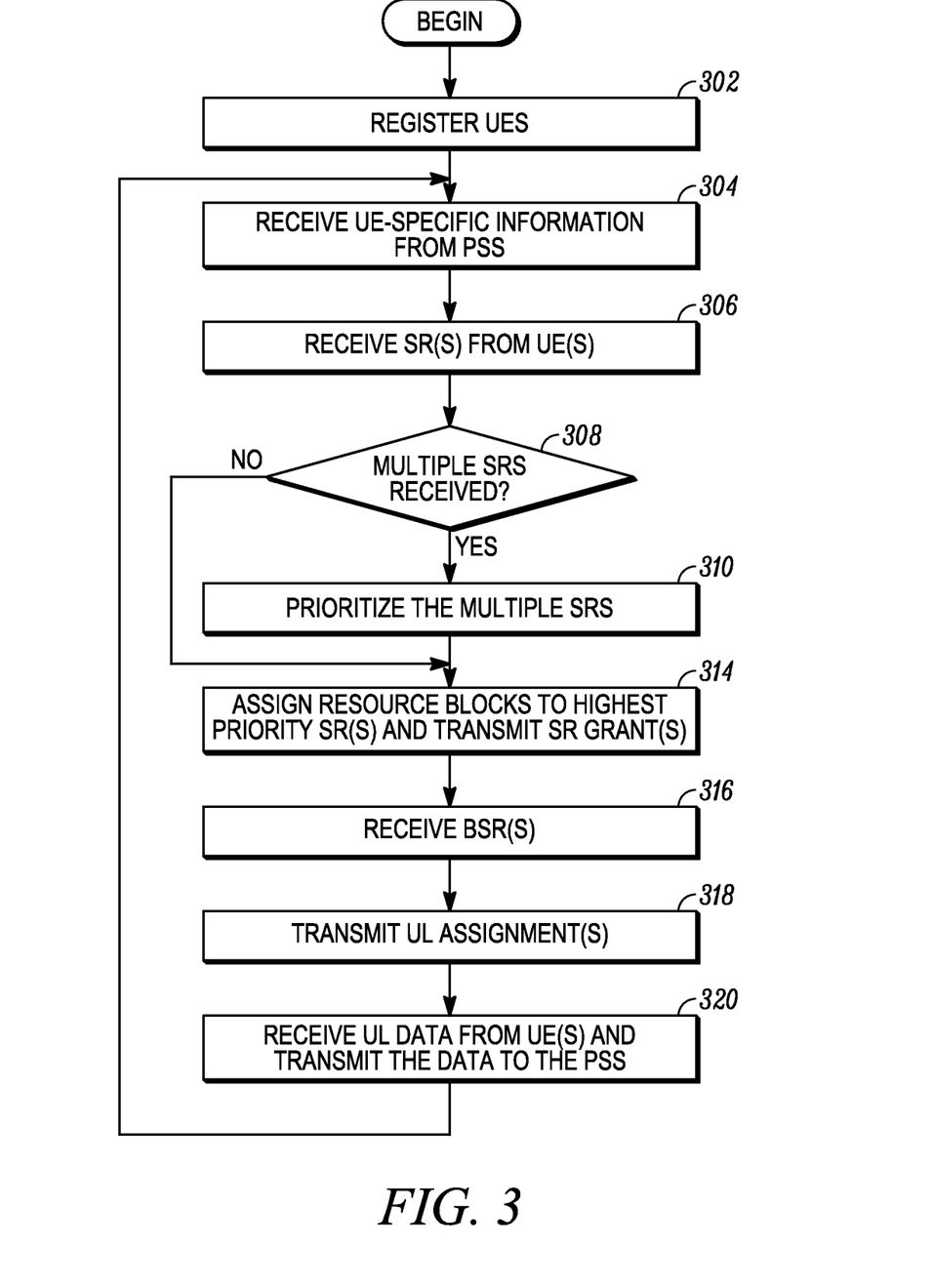
FIG. 3 is a flowchart of a method for an eNB to receive and grant SRs, in accordance with an example embodiment.
Figure 4:
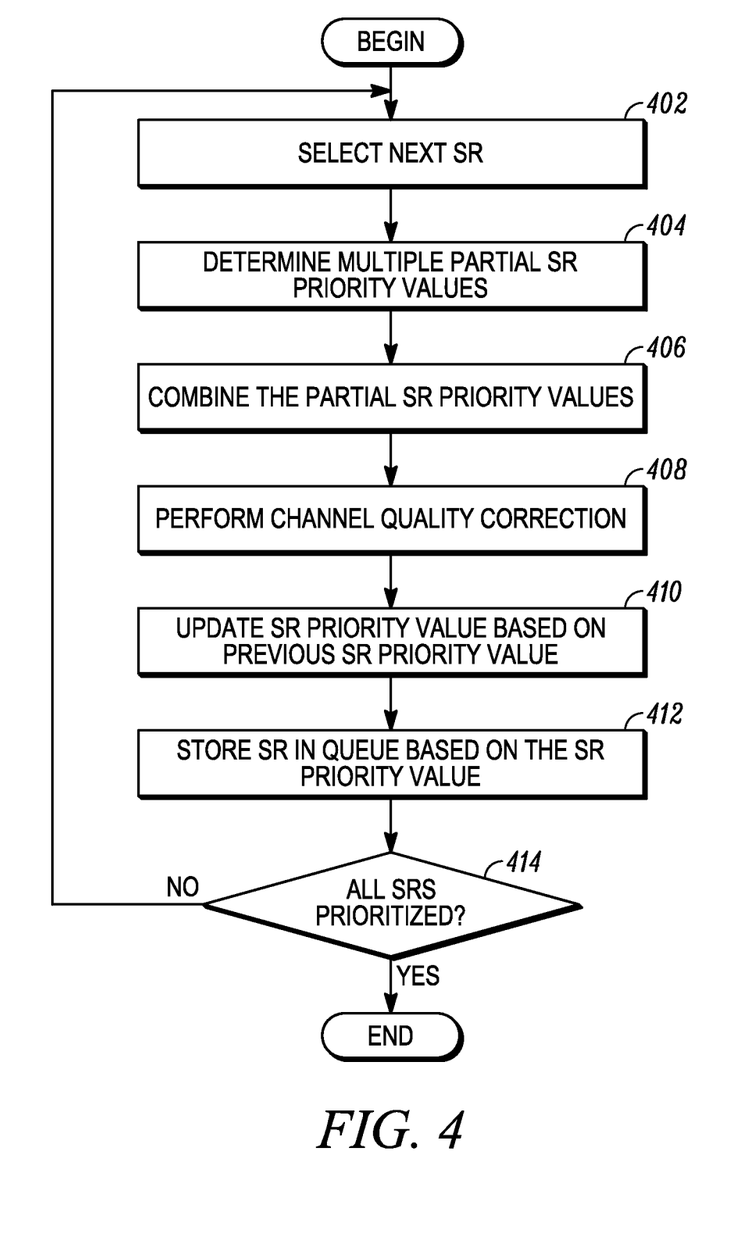
FIG. 4 is a flowchart of a method for prioritizing SRs, in accordance with an example embodiment.
Figure 5:
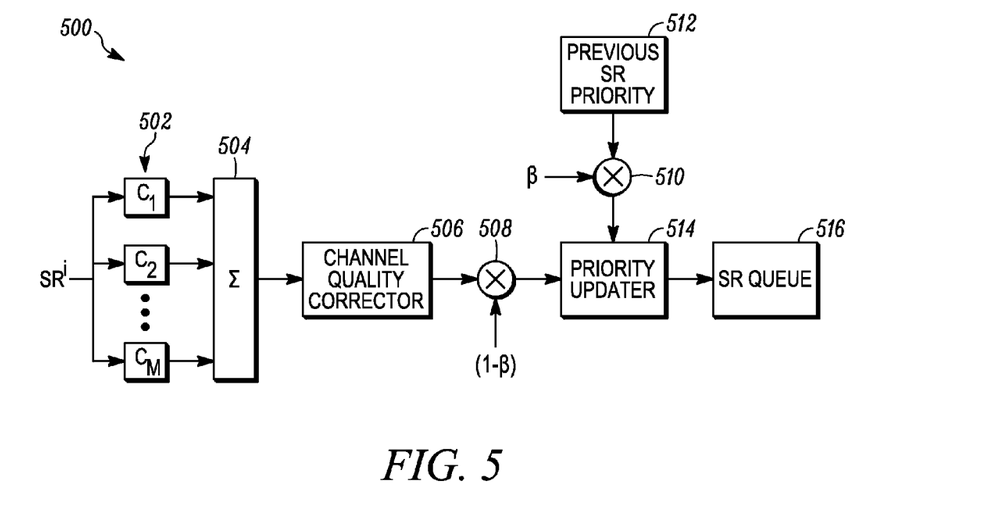
FIG. 5 is a simplified block diagram of an SR scoring and scheduling system, in accordance with an example embodiment.
Figure 6:
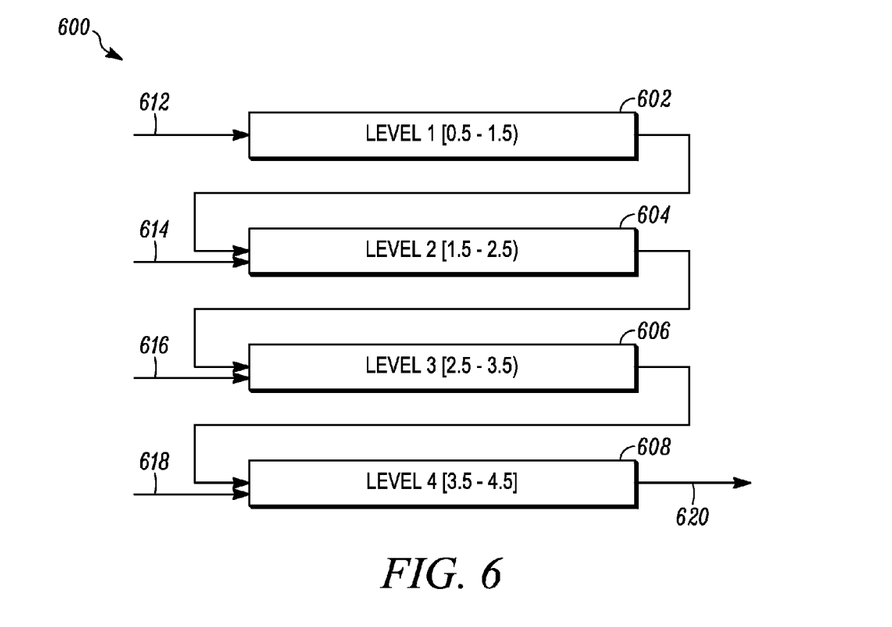
FIG. 6 is a simplified block diagram of a multi-level queue for use in SR scheduling, in accordance with an example embodiment.

A particular embodiment includes an eNB receiving multiple SRs from multiple UEs, the eNB prioritizing the SRs based on multiple scoring criteria (e.g., a set of the criteria listed above), and the eNB transmitting SR grants to a subset of the multiple UEs that are associated with relatively high priority SRs. Details regarding processes performed by a UE and an eNB are illustrated in FIGS. 2-4, described below. More particularly, FIG. 2 illustrates processes performed by a UE, and FIGS. 3 and 4 illustrate processes performed by an eNB. FIGS. 5 and 6 illustrate other aspects of the functioning of an eNB, in accordance with various embodiments.

FIG. 2 is a flowchart of a method for a UE (e.g., UE 116, FIG. 1) to upload data to a wireless communication system (e.g., system 100, FIG. 1), in accordance with an example embodiment. The method may be performed, for example, by a user communication device (e.g., user communication device 110, FIG. 1). The method may begin, in block 202, when the user communication device is powered up. At that time, the device automatically may register with the PSS (e.g., PSS 120, FIG. 1) and with an eNB (e.g., eNB 132, FIG. 1). Alternatively, the device automatically may register with an eNB when the device is handed off to the eNB. Registration with the PSS and eNB may be performed using the device radio (e.g., radio 112, FIG. 1) and the device UE (e.g., UE 116, FIG. 1), respectively. Essentially, registration with either the PSS or the eNB includes the exchange of a series of messages intended to notify the PSS and eNB that the user communication device has been activated.

When the user communication device registers with the PSS, the PSS client of the device (e.g., PSS client 114, FIG. 1) transmits a user ID to the PSS. This user ID enables the PSS gateway (e.g., PSS gateway 124, FIG. 1) to determine at least two types of information associated with the user of the user communication device. According to an embodiment, this includes a user role and a jurisdictional coverage area (JCA). The PSS gateway may determine this information, for example, by accessing a table that associates known user IDs with user roles and JCAs. The user role and the JCA are considered to be static information. The user role may indicate the position and/or rank of the user, for example (e.g., uniformed police officer, undercover police officer, detective, SWAT officer, police chief, sheriff, firefighter, fire chief, fire marshal, and so on). The JCA may indicate, for example, whether the user (and/or user communication device) is located in its assigned service area or is located outside of its assigned service area.

As will be discussed in more detail later, once the PSS gateway has determined the user role and JCA for a particular user communication device, the PSS gateway may communicate this information to the eNB (e.g., via a dedicated connection 150 or network 140, PDN gateway 136, and serving gateway 134, FIG. 1). Because the user communication device 110 also has registered with the eNB, the eNB may associate the user role and JCA received from the PSS with the user communication device 110 (or more specifically, with the UE of the user communication device).

In addition to static information, the user communication device also may receive, in block 204, bounding data from the PSS that specifies dynamic information relating to an incident. The dynamic information may be received or conveyed in close temporal proximity to registering the user communication device, or it may be received or conveyed some time after registration has been completed. According to an embodiment, dynamic information includes an application type and an incident type. The application type indicates the type of data to be communicated between the user communication device and the PSS, and/or the type of application (e.g., application 128, FIG. 1) that the PSS will execute in order to render the data on the personnel console. For example, but not by way of limitation, the application type may include a video processing application (high or low quality), an image processing application (high or low quality), an audio processing application, a data processing application, an MPTT application, a fire ground (FG) application, a CAD messaging application, a CAD location update application, and so on. When the user communication device is initiating uplink transmission of data to be rendered on the personnel console, the radio (e.g., radio 112, FIG. 1) of the user communication device may communicate the application type to the PSS.

The incident type indicates what type of incident is occurring. For example, but not by way of limitation, the incident type may indicate that the incident corresponds to a fire, a robbery, a high speed chase, a routine traffic stop, a gunshot wound, a hostage situation, a natural catastrophe, and so on. A user of the user communication device may convey the incident type to the PSS when the user initiates an incident response with the PSS. For example, a user may initiate communications with the PSS (e.g., using a PTT feature of the user communication device) and, at that time, may verbally communicate the incident type to a dispatcher (e.g., a dispatcher at personnel console 126, FIG. 1). The dispatcher may enter information into the personnel console, which indicates the user-identified incident type. Alternatively, when the dispatcher contacts the user (e.g., using a PTT feature of a personnel console) to dispatch the user to an existing incident (e.g., an incident previously initiated by another user), the dispatcher may enter information into the personnel console to associate the new user with the incident and incident type.

Once the incident type and application type are known at the PSS, the PSS may transmit bounding data to the user communication device (via radio interface 122 and radio 112, for example), where the bounding data specifies the incident type and the application type. According to an embodiment, the bounding data (or the incident type and application type) also is sent by the PSS to the eNB (via PSS gateway 124, dedicated connection 150 or network 140, PDN gateway 136, and serving gateway 134, FIG. 1), and the eNB may associate the incident type and application type received from the PSS with the user communication device 110 (or more specifically, with the UE of the user communication device).

In block 208, a determination is made whether the user communication device has uplink data to transmit to the PSS. For example, uplink data may be collected by a DCD (e.g., DCD 118, FIG. 1) and stored in an uplink data queue. For example, but not by way of limitation, during a routine traffic stop, a police officer may turn on a video camera (e.g., a particular type of DCD), and the camera may begin storing video data into the uplink data queue. When a sufficient quantity of data is stored in the queue, the user communication device may determine that it has uplink data to transmit, and the UE may proceed to transmit an SR to the eNB, in block 212, which will be described later.

As mentioned previously, in certain configurations, the user communication device may transmit an SR to the eNB periodically, regardless of whether or not the user communication device has uplink data to transmit. Accordingly, when a determination is made in block 208 that the user communication device does not have uplink data to transmit, a further determination may be made, in block 210, whether it is time to transmit a periodic SR. If not, the method iterates as shown, where the method either waits until there is uplink data to transmit or until it is time to transmit a periodic SR.

When there is uplink data to transmit or when it is time to transmit a periodic SR, the UE transmits an SR to the eNB, in block 212. According to an embodiment, the UE transmits the SR to the eNB on the Physical Uplink Control Channel (PUCCH). The UE thereafter waits for a response to the SR from the eNB. More particularly, the UE waits to receive an SR grant from the eNB. According to an embodiment, an SR grant may be received on the Physical Downlink Control Channel (PDCCH). The SR grant essentially indicates that the eNB has granted the UE's SR. As will be discussed further in conjunction with FIGS. 3-6, the eNB's decision whether or not to grant the UE's SR may be made based on a prioritization process that takes into account multiple factors.

When a determination is made, in block 214, that an SR grant has been received, the UE may transmit a Buffer Status Report (BSR) to the eNB, in block 216. According to an embodiment, the UE transmits the BSR to the eNB on the Physical Uplink Shared Channel (PUSCH). The BSR includes an indication of how much data the UE would like to transmit to the eNB. As will be described in more detail later, the eNB may assign resources (e.g., resource blocks) for the UE to use to transmit the uplink data, in response to receiving the BSR from the UE. The assigned resources are conveyed by the eNB to the UE in an uplink (UL) assignment message, which the UE waits to receive on the PDCCH.

In block 218, when a determination is made that the UE has received a UL assignment, the UE may proceed to transmit the uplink data to the eNB using the assigned resources on the PUSCH, in block 220. The method may then iterate as shown.

Embodiments of methods and apparatus implemented in an eNB for granting SR requests will now be described in conjunction with FIGS. 3-6. More particularly, FIG. 3 is a flowchart of a method for an eNB (e.g., eNB 132, FIG. 1) to receive and grant SRs, in accordance with an example embodiment. The method may be performed, for example, by an eNB (e.g., eNB 132, FIG. 1).

The method may begin, in block 302, when a plurality of UEs registers with the eNB. As mentioned previously, a UE may register with the eNB upon power up of the UE or when a UE is handed over to the eNB, and registration essentially includes the exchange of a series of messages between the UE and the eNB. Some time after the UE is registered with the eNB, the eNB may receive UE-specific information for one or more of the registered UEs from the PSS, in block 304. For example, as discussed previously, the eNB may receive static information for a UE, such as the user role and JCA. The eNB may then associate the static information with the registered UE.

In addition to receiving the static information for a UE, the eNB also may receive dynamic information for the UE from the PSS (e.g., when a user of a user communication device has reported or is being dispatched to an incident). The dynamic information relates to a specific incident, and may be received before or after the eNB has received an SR from the UE. Either way, as discussed previously, the dynamic information may include an application type and an incident type. At that time, the eNB may associate the dynamic information with the UE. As used herein, the user role, JCA, application type, and incident type all may be considered to be "information associated with a public safety activity."

In block 306, the eNB may receive one or more SRs from UEs that are registered with the eNB. As mentioned previously, the eNB may receive multiple SRs from UEs during a single subframe. According to an embodiment, when a determination is made, in block 308, that multiple SRs have been received during a subframe, the eNB may prioritize the multiple SRs, in block 310. Alternatively, the eNB may prioritize the multiple SRs only when a threshold number of SRs have been received during a subframe. The eNB prioritizes the multiple SRs based on multiple scoring criteria, as discussed previously. As used herein, a portion of the eNB responsible for prioritizing the SRs may be referred to as an "eNB scheduler." Prioritization of SRs will be discussed in detail in conjunction with FIGS. 4-6, later. Basically, the eNB scheduler determines a priority value for each of the multiple SRs, and the SRs are placed in a queue (e.g., queue 600, FIG. 6) in order of their priority values.

In block 314, beginning with the highest priority SR, the eNB determines whether sufficient resources (e.g., resource blocks) are available to grant the SR. If so, the eNB grants the SR by assigning the resources for the SR. The eNB then selects the next highest priority SR, and determines whether sufficient resources are available to grant that SR. This process is repeated until the eNB determines that insufficient resources are available to grant any additional SRs. All granted SRs are transmitted to UEs on a PDCCH. In some cases, there may be sufficient resources to grant all of the received SRs. However, in other cases, only a subset of the multiple received SRs may be granted.

In block 316, the eNB may thereafter receive BSRs from those UEs that received SR grants. Accordingly, the BSRs are received in response to the SR grants transmitted by the eNB. In block 318, in response to receiving the BSRs, the eNB may transmit UL assignments to the UEs associated with the BSRs. Thereafter, in block 320, the eNB may receive uplink data from the UEs. The method may then iterate as shown.

As discussed above, the eNB prioritizes the multiple SRs based on multiple scoring criteria, as discussed previously. As used herein, the term "priority" means a value assigned to an SR, and the term "prioritize" refers to the process of assigning the value to the SR. According to an embodiment, a "high priority" SR has a relatively high priority value. In other embodiments, there may be an inverse relationship between the priority value and the priority of an SR. In an example embodiment discussed below, the system may assign priorities within a range from 0.5 to 4.5, although priorities may be assigned within different ranges, as well.

FIG. 4 is a flowchart of a method for prioritizing SRs (e.g., block 310, FIG. 3), in accordance with an example embodiment. The method of FIG. 4 may be performed by an eNB scheduler of an eNB, in an embodiment. FIG. 4 should be viewed in conjunction with FIG. 5 for enhanced understanding of the various embodiments, where FIG. 5 is a simplified block diagram of an SR scoring and scheduling system 500, in accordance with an example embodiment.

Referring first to FIG. 4, the SR prioritization method may begin, in block 402, when the eNB scheduler selects a next SR for prioritization. For example, the next SR may be one of multiple SRs that have been received by the eNB during a subframe. Referring also to FIG. 5, the next SR for prioritization is referred to as "$SR^i$", where i=1 . . . N, and N is the number of SRs to be prioritized (e.g., the number of SRs received during a subframe).

In block 404, multiple partial priority values are determined for the selected SR, where a partial priority value is associated with each of multiple scoring criteria. The multiple partial priority values may be determined, for example, using a plurality of partial priority calculation blocks 502, where each block 502 is configured to calculate a partial priority based on one of the multiple scoring criteria. In FIG. 5, the multiple scoring criteria are referred to as $C_1 \ldots C_M$, where M is the number of scoring criteria. According to an embodiment, and as discussed previously the multiple scoring criteria include two or more criteria selected from a group consisting of an indication of QoS between a UE and the eNB, information associated with a public safety activity (e.g., one or more public safety activity characteristics selected from a group consisting of a user role, a JCA, an incident type, and an application type), a UE transmit time interval, a known quantity of data to be transmitted by the UE, whether or not a UE periodically transmits a scheduling request, a CQI, and an RSRP indicator.

For example, criterion $C_1$ may correspond to a QoS criterion, which is an indication of the quality of service between a UE and the eNB. According to an embodiment, the QoS criterion may be based on a standardized QoS Class Identifier (QCI) priority having a value that is determined by a number of parameters. For example, a QCI priority having a value of 1 (highest) to 9 (lowest) may be determined based on a resource type parameter (e.g., whether the data is given a guaranteed bit rate (e.g., for streaming, real-time gaming, VoIP) or a non-guaranteed bit rate (e.g., TCP, FTP, web, best effort service)), a delay budget (e.g., 50 ms, 100 ms, 150 ms, 300 ms, and so on), and a packet loss parameter (e.g., $10^{-2}$, $10^{-3}$, $10^{-6}$, and so on).

The relationship between the QoS criterion value and the QCI may have an inverse relationship (e.g., since a value of 1 is the highest QCI priority, the QoS criterion value may be relatively high for a QCI of 1). According to a particular embodiment, for example, the scheduler accesses a mapping, stored in memory, which correlates QCIs and QoS criterion values. An example mapping is represented in Table 1, below:

TABLE 1

QCI Priority to QoS Criterion Mapping

| QCI Priority | QoS Criterion Value |
| --- | --- |
| 1 | 4.5 |
| 2 or 3 | 4.0 |
| 4 and 5 | 3.0 |
| 6 and 7 | 2.5 |
| 8 and 9 | 2.0 |

Criterion $C_2$ may correspond to a UE transmit time interval criterion, which is an indication of a time interval, $T_{noTx}$, that has elapsed since the UE most recently transmitted uplink data to the eNB. When the time interval is relatively short, the transmit time interval criterion may have a relatively low value, and when the time interval is relatively long, the transmit time interval criterion may have a relatively high value. According to a particular embodiment, for example, the scheduler accesses a mapping, stored in memory, which correlates $T_{noTx}$ and transmit time interval criterion values. An example mapping is represented in Table 2, below:

TABLE 2

$T_{noTx}$ to Transmit Time Interval Criterion Mapping

| $T_{noTx}$ | Transmit Time Interval Criterion Value |
| --- | --- |
| >=80 ms | 4.0 |
| 40 to 80 ms | 3.5 |
| 20 to 40 ms | 3.0 |
| 10 to 20 ms | 2.5 |
| <10 ms | 2.0 |

Criterion $C_3$ may correspond to a criterion reflecting a known quantity of data to be transmitted by the UE, also referred to herein as a BSR size criterion (e.g., an existing, known BSR size at the scheduler). According to an embodiment, an initial BSR size criterion value for a relatively large existing BSR size is low (e.g., 2.0). Two parameters may be defined in the scheduler to monitor uplink transmissions for an existing BSR. These parameters are the percentage of completed transfer and the average transfer percentage. Using these parameters, a remaining number of times for uplink transfers, $N_{ULTx}$, may be given by:

$$N_{ULTx} = (1 - \text{completed transfer percentage}) / \text{average transfer percentage}.$$

According to a particular embodiment, for example, the scheduler accesses a mapping, stored in memory, which correlates $N_{ULTx}$ and BSR size criterion values. An example mapping is represented in Table 3, below:

TABLE 3

$N_{ULTx}$ to BSR Size Criterion Mapping

| $N_{ULTx}$ | BSR Size Criterion Value |
| --- | --- |
| 0 | 4.0 |
| 0 to 3 | 3.0 |
| >3 | 2.0 |

Criterion $C_4$ may correspond to a criterion indicating whether or not a UE is configured to periodically transmit an SR. A UE may be configured to transmit an SR periodically, for example, with a particular time period between SR transmissions. An embodiment initially may give a periodic SR a relatively low score (e.g., 2.0), because a likelihood exists that the UE may transmit zero BSR.

Criterion $C_5$ may correspond to a CQI criterion and/or an RSRP indicator. The UE may transmit a channel quality report to the eNB, which provides an indication of the received reference signal strength at the UE. A low CQI index (on the PUCCH or PUSCH) and a low RSRP value indicates that the UE may be located in an area characterized by poor signal conditions. According to an embodiment, an SR from such a UE initially is given a relatively low CQI/RSRP criterion value, because of the likelihood of retransmissions from such a UE. For example, a CQI/RSRP criterion value of 2.0 may be assigned when the CQI index <10 and the RSRP<RSRP 40 (−100 dBm).

In addition to the above scoring criteria, and as mentioned above, the multiple scoring criteria also may include scoring criteria reflecting information associated with a public safety activity, according to various embodiments. For example, the information associated with the public safety activity may include one or more public safety activity characteristics selected from a group consisting of a user role (static), a JCA (static), an incident type (dynamic), and an application type (dynamic), as discussed above.

Each of these public safety activity characteristics may be evaluated separately (e.g., each may have an associated criterion, such as criterion $C_6$ for user role, criterion $C_7$ for JCA, criterion $C_8$ for incident type, and criterion $C_9$ for application type). For example, a user role criterion may have a relatively high priority value for certain personnel (e.g., police chief) and a relatively low value for other personnel (e.g., security guard). A JCA criterion may have a relatively high value for in jurisdiction conditions, and a relatively low value for out-of-jurisdiction conditions. An incident type criterion may have a relatively high value for extremely urgent or dangerous incidents (e.g., gunshot wound, explosion), and a relatively low value for non-urgent or low-danger incidents (e.g., a routine traffic stop). An application type criterion may be defined by a network operator and/or public safety agencies. For example, one agency may define a video stream application as having a higher priority than a voice processing application, whereas another agency may define a PTT application as having a higher priority than a video processing application.

In an alternate embodiment, some or all of the public safety activity characteristics may be evaluated together (e.g., a single public safety activity criterion may have values that are based on certain combinations of the public safety activity characteristics). Although an extensive list of possible combinations of public safety activity characteristics could be generated, an example mapping of public safety (PS) activity criterion to a few example combinations of the public safety activity characteristics is represented in Table 4, below:

TABLE 4

Public Safety Activity Characteristics/Criterion Value Mapping

| Public Safety Activity Characteristics | PS Criterion Value |
| --- | --- |
| user role = police chief; JCA = In; incident type = emergency; application = CAD | 4.5 |
| user role = police chief; JCA = In; incident type = high speed chase; application = FG | 4.0 |
| user role = police officer; JCA = In; incident type = gun shot; application = video stream | 3.0 |
| user role = police officer; JCA = In; incident type = dispatch; application = CAD | 2.5 |

TABLE 4-continued

Public Safety Activity Characteristics/Criterion Value Mapping

| Public Safety Activity Characteristics | PS Criterion Value |
|---|---|
| user role = police officer; JCA = Out; incident type = high speed chase; application = FG | 2.0 |

The plurality of partial priority calculation blocks 502 produces multiple partial priority values. In block 406, the multiple partial priority values are combined (e.g., by combiner 504). According to various embodiments, each of the partial priority values may be unweighted or weighted, prior to combining For example, in an embodiment, each of the partial priority calculation blocks 502 may apply a weighting to each of the multiple scoring criteria prior to providing the partial priority value to combiner 504. Alternatively, combiner 504 may apply weightings to each of the multiple partial priority values. Either way, in an embodiment, combiner 504 produces a total priority value, $SR_{total}^i$ that is related to the priority value for the selected SR as follows:

$$SR_{total}^i = \sum_{m=1}^{M} \omega_m C_m,$$

where $C_m$ is a partial priority value, $\omega_m$ is the weighting applied to that partial priority value, and m=1 . . . M. The weightings applied to each of the scoring criterion control the influence that each scoring criterion has on the total priority value. For example, a QoS criterion and one or more of the public safety activity criteria may be given higher weightings than other criteria, although this is not necessarily so. In an embodiment, the weightings applied to each of the partial priority values may be adjusted to give more or less influence to various ones of the scoring criteria. Adjustments to the weightings may be performed automatically (e.g., based on some system performance metric or other factor), or may be implemented by an individual having appropriate permission to control the functioning of the eNB.

In block 408 a channel quality correction optionally may be performed (e.g., by channel quality corrector 506), which includes potentially adjusting the total priority value based on an indicator of the quality of the channel between the UE associated with the SR and the eNB. Various embodiments may use any of a number of channel quality indicators. According to a particular embodiment, a power headroom report (PHR) from the UE is used as the indicator of channel quality. A PHR is a report transmitted by a UE to an eNB, which indicates a delta between a maximum allowable UE transmit power and an actual UE transmit power. Generally, a high actual UE transmit power (e.g., a small delta) indicates that the UE may be relatively far from the eNB (e.g., at or near the cell edge), and thus the UE is transmitting at maximum or near maximum power. In an embodiment, the SR for a UE having a high actual UE transmit power (e.g., a small delta) may have its total priority value reduced significantly. In contrast, the SR for a UE having a relatively low actual UE transmit power (e.g., a relatively large delta) may not have its total priority value reduced at all, or may have its total priority value reduced only slightly. According to a particular embodiment, the scheduler accesses a mapping, stored in memory, to select an adjustment factor, $\alpha_{PHR}$, based on the PHR received from the UE associated with the SR. An example mapping is represented in Table 5, below:

TABLE 5

$\alpha_{PHR}$ to PHR Mapping

| $\alpha_{PHR}$ | PHR |
|---|---|
| 1.0 | > POWER_HEADROOM_60 |
| 0.9 | POWER_HEADROOM_50 to 59 |
| 0.8 | POWER_HEADROOM_40 to 49 |
| 0.75 | POWER_HEADROOM_30 to 39 |
| 0.7 | POWER_HEADROOM_20 to 29 |
| 0.65 | POWER_HEADROOM_10 to 19 |
| 0.6 | POWER_HEADROOM_0 to 9 |

In an embodiment, channel quality corrector 506 produces a corrected, total priority value, $SR_{corrected}^i$, as follows:

$$SR_{corrected}^i = \alpha_{PHR} SR_{total}^i.$$

According to a further embodiment, the adjustment factor, $\alpha_{PHR}$, gradually may be increased in order to avoid scenarios in which a UE may be "starved" (e.g., prevented indefinitely or for a relatively long time from transmitting uplink data due to a relatively low corrected SR priority value). Gradual increases to the adjustment factor may be accomplished, for example, by the scheduler maintaining a counter, which indicates how many SRs have been received from the UE since the last time the UE was sent an SR grant. As the value of the counter increases, the adjustment factor, $\alpha_{PHR}$, may be gradually increased, as well.

In block 410, the corrected SR priority value may be updated (e.g., by priority updater 514) based on a previous SR priority value determined based on one or more previously received SRs for the same UE. For example, when an SR is already pending in the queue (e.g., queue 600, FIG. 6) at this point for a UE, and a new SR has been received from the same UE (e.g., $SR^i$, for which the current calculation is being performed), the priority value, $SR_{previous}$, for the previously received SR that is pending in the queue optionally may be adjusted based on the priority value for the new SR (e.g., $SR_{corrected}^i$). In a particular embodiment, an updated SR priority value, $SR_{updated}^i$, may be determined as an exponential average according to:

$$SR_{updated}^i = \beta(SR_{previous}) + (1-\beta)SR_{corrected}^i,$$

where $\beta$ is a parameter having a value between 0 and 1, which controls the relative weights given to the priority values for the new SR and the previously received SR. Calculation of $SR_{updated}^i$ may be accomplished, for example, by multiplying (e.g., by multiplier 508) the priority value for the new SR with $(1-\beta)$, multiplying (e.g., by multiplier 510) the priority value 512 for the previously received SR that is pending in the queue with $\beta$, and adding the two products (e.g., by priority updater 514). The result of the updating process may be considered to be the final SR priority value, in an embodiment. In other embodiments, either or both of processes 408, 410 may be excluded in the calculation of a final SR priority value.

Either way, in block 412, the SR is stored in an SR queue 516 (e.g., queue 600, FIG. 6) based on the calculated priority value (e.g., $SR_{updated}^i$). In a particular embodiment, the SR is stored in a multi-level queue, although the SR may be stored in a flat queue, in other embodiments. FIG. 6 is a simplified block diagram of a multi-level queue 600 for use in SR scheduling, in accordance with an example embodiment. In the illustrated embodiment, queue 600 includes four levels 602, 604, 606, 608, where each level is associated with a range of SR priority values. For example, the lowest level 602 (Level 1) may be used to store SRs with SR priority values in a range of [0.5, 1.5), a next highest level 604 (Level 2) may be used to store SRs with SR priority values in a range of [1.5, 2.5), a next highest level 606 (Level 3) may be used to store SRs with SR priority values in a range of [2.5, 3.5), and a highest level 608 (Level 4) may be used to store SRs with SR priority values in a range of [3.5, 4.5]. As used herein, a range defined as [a, b) means that the lower bound of the range is equal to a, and the upper bound of the range is less than b. A range defined as [a, b] means that the lower bound of the range is equal to a, and the upper bound of the range is equal to b. Those of skill in the art would understand, based on the description herein, that a multi-level queue may include more or fewer levels, the various levels may be used to store SRs having values in different ranges, and a different total range may be implemented (e.g., instead of a total range of 0.5 to 4.5, a different total range may be used).

Each queue level 602, 604, 606, 608 may be used to store from one to a plurality of SRs (e.g., from 1 to 250 or more SRs). Once an SR priority value has been calculated, and no other SRs are pending in the queue 600 for the same SR, the corresponding SR may be injected into the queue 600 based on the priority value. More particularly, the SR may be injected into a queue level 602, 604, 606, 608 that corresponds to the range of priority values in which the calculated SR priority value falls. For example, when the priority level for a particular SR is calculated to equal 1.7, the SR may be injected into level 604 (Level 2) of the queue. In an embodiment, an SR being injected into a queue level 602, 604, 606, 608 is injected based on its actual calculated priority value (e.g., $SR_{updated}^i$). In an alternate embodiment, an SR being injected into a queue level 602, 604, 606, 608 may be given an initial priority value that corresponds to that queue level 602, 604, 606, 608, regardless of the actual calculated priority value (e.g., all SRs being injected into level 602 may be given an initial value of 1.0, SRs being injected into level 604 may be given an initial value of 2.0, SRs being injected into level 606 may be given an initial value of 3.0, and SRs being injected into level 608 may be given an initial value of 4.0).

Queue inputs 612, 614, 616, 618 indicate injection pathways for the queue levels 602, 604, 606, 608, respectively, which may be used to initially inject an SR into the queue 600 (e.g., upon the calculation of an SR priority value for a UE that does not currently have an SR in the queue (i.e., for a UE for which no previously received SR is pending). As additional SRs are received from a UE having a pending SR in the queue 600, the previously stored SR may move up or down in the queue (e.g., up or down within a level 602, 604, 606, 608, or up or down between levels 602, 604, 606, 608) as the SR priority value is updated (e.g., by priority updater 514).

According to an embodiment, the eNB assigns resource blocks and transmits SR grants (e.g., in block 314, FIG. 3) to as many of the highest priority SRs as possible. Those SRs that will receive SR grants are pulled from the highest queue level 608 via queue output 620, for example. According to an embodiment, the eNB assigns resource blocks to the highest priority SR in the highest level 608 first, all of the remaining SRs may move up in the queue, and then, if there are still resources available, the eNB assigns resource blocks to the next highest priority SR (now the highest priority SR), and so on.

Referring again to FIG. 4, in block 414, a determination is made whether priority values have been determined for all received SRs (e.g., all SRs received during a particular subframe). If not, the method iterates as shown. If so, the method ends (e.g., proceeds to block 314, FIG. 3).

The foregoing detailed description is merely exemplary in nature and is not intended to limit the invention or the application and uses of the invention. Furthermore, there is no intention to be bound by any expressed or implied theory presented in the preceding technical field, background, brief summary or detailed description.

For simplicity and clarity of illustration, the drawing figures illustrate the general manner of construction, and descriptions and details of well-known features and techniques may be omitted to avoid unnecessarily obscuring the invention. Additionally, elements in the drawings figures are not necessarily drawn to scale. For example, the dimensions of some of the elements or regions in some of the figures may be exaggerated relative to other elements or regions of the same or other figures to help improve understanding of embodiments of the invention.

The terms "first," "second," "third," "fourth" and the like in the description and the claims, if any, may be used for distinguishing between similar elements and not necessarily for describing a particular sequential or chronological order. It is to be understood that the terms so used are interchangeable under appropriate circumstances such that the embodiments of the invention described herein are, for example, capable of operation or use in sequences other than those illustrated or otherwise described herein. Furthermore, the terms "comprise," "include," "have" and any variations thereof, are intended to cover non-exclusive inclusions, such that a process, method, article, or apparatus that comprises a list of elements is not necessarily limited to those elements, but may include other elements not expressly listed or inherent to such process, method, article, or apparatus. It is to be understood that the embodiments of the invention described herein may be used, for example, in other orientations than those illustrated or otherwise described herein. The term "coupled," as used herein, is defined as directly or indirectly connected in an electrical or non-electrical manner.

An embodiment includes a method for granting scheduling requests in a wireless communications system that includes an eNB, a plurality of UEs, and a public safety system. The method is performed by the eNB and includes the steps of receiving multiple scheduling requests from multiple UEs of the plurality of UEs, where each of the multiple scheduling requests indicates that a corresponding one of the multiple UEs is requesting uplink data transmission resources from the eNB, determining a priority value for each of the multiple scheduling requests based on multiple scoring criteria, resulting in a plurality of priority values associated with the multiple scheduling requests, and transmitting one or more scheduling request grants to a subset of the multiple UEs, where the subset includes one or more UEs of the multiple UEs that are associated with one or more scheduling requests of the multiple scheduling requests having relatively high priority values of the plurality of priority values.

According to a further embodiment, the multiple scoring criteria include two or more criteria selected from a group consisting of an indication of quality of service between a UE and the eNB, information associated with a public safety activity, a UE transmit time interval, a known quantity of data to be transmitted by the UE, whether or not a UE periodically transmits a scheduling request, a channel quality indicator, and a reference signal received power indicator. According to another further embodiment, the multiple scoring criteria include information associated with a public safety activity, where the information associated with the public safety activity includes one or more public safety activity characteristics selected from a group consisting of a user role, a jurisdictional coverage area, an incident type, and an application type.

According to another further embodiment, the multiple scoring criteria include information associated with a public safety activity, and the method further includes receiving the information associated with the public safety activity from a public safety system.

According to another further embodiment, determining the priority value includes, for each of the multiple scheduling requests, determining a partial priority value for each criterion of the multiple scoring criteria, resulting in multiple partial priority values, and combining the multiple partial priority values to generate a total priority value, where the priority value for a scheduling request is related to the total priority value. According to another further embodiment, determining the priority value further includes, for each of the multiple scheduling requests, adjusting the priority value determined for a scheduling request based on a channel quality indicator from a UE associated with the scheduling request. According to another further embodiment, determining the priority value further includes, for each of the multiple scheduling requests, adjusting the priority value for a scheduling request from a UE based on a previously determined priority value determined for a previously received scheduling request from the UE.

According to another further embodiment, the method further includes arranging the multiple scheduling requests in a queue in order of the priority values associated with the multiple scheduling requests. According to another further embodiment, arranging the multiple scheduling requests in the queue includes arranging the multiple scheduling requests in a multi-level queue. According to another further embodiment, transmitting the one or more scheduling request grants includes determining whether resource blocks are available for scheduling, when the resource blocks are available, assigning the resource blocks to one or more highest priority scheduling requests in the queue, and transmitting the one or more scheduling request grants to one or more UEs associated with the one or more highest priority scheduling requests.

According to another further embodiment, the method further includes receiving a buffer status report from a UE in response to transmitting a scheduling request grant to the UE, transmitting an uplink assignment to the UE in response to receiving the buffer status report, and receiving data from the UE in response to transmitting the uplink assignment.

Another embodiment includes a method for conveying data in a communication system, which implements a 3GPP LTE standard, and which includes an eNB and a plurality of UEs. The method is performed by the eNB and includes the steps of receiving multiple scheduling requests from multiple UEs of the plurality of UEs, where each of the multiple scheduling requests indicates that a corresponding one of the multiple UEs is requesting uplink data transmission resources from the eNB, determining a priority value for each of the multiple scheduling requests based on scoring criteria that includes information associated with a public safety activity, resulting in a plurality of priority values associated with the multiple scheduling requests, and transmitting one or more scheduling request grants to a subset of the multiple UEs, where the subset includes one or more UEs of the multiple UEs that are associated with scheduling requests of the multiple scheduling requests having relatively high priority values of the plurality of priority values.

According to a further embodiment, the information associated with the public safety activity includes one or more public safety activity characteristics selected from a group consisting of a user role, a jurisdictional coverage area, an incident type, and an application type. According to another further embodiment, the scoring criteria also includes one or more additional criteria selected from a group consisting of an indication of quality of service between a UE and the eNB, a UE transmit time interval, a known quantity of data to be transmitted by the UE, whether or not a UE periodically transmits a scheduling request, a channel quality indicator, and a reference signal received power indicator. According to another further embodiment, the method further includes receiving the information associated with the public safety activity from a public safety system.

Another embodiment includes a communications system with an eNB configured to receive multiple scheduling requests from multiple UEs, where each of the multiple scheduling requests indicates that a corresponding one of the multiple UEs is requesting uplink data transmission resources from the eNB. The eNB is also configured to determine a priority value for each of the multiple scheduling requests based on multiple scoring criteria, resulting in a plurality of priority values associated with the multiple scheduling requests, and to transmit one or more scheduling request grants to a subset of the multiple UEs, where the subset includes one or more UEs that are associated with scheduling requests having relatively high priority values. According to a further embodiment, the eNB is configured to implement a 3GPP LTE standard based on OFDM.

According to another further embodiment, the multiple scoring criteria include information associated with a public safety activity, the system further includes a public safety system configured to communicate with the eNB to determine the information associated with the public safety activity, and an interface between the public safety system and the eNB configured to enable the eNB to receive the information associated with the public safety activity from the public safety system.

According to another further embodiment, the eNB is configured to determine the priority value for a scheduling request from a UE by determining a partial priority value for each criterion of the multiple scoring criteria, resulting in multiple partial priority values, combining the multiple partial priority values to generate a first intermediate priority value, adjusting the first intermediate priority value based on a channel quality indicator from the UE associated with the scheduling request, resulting in a second intermediate priority value, and adjusting the second intermediate priority value based on a previously determined priority value determined for a previously received scheduling request from the UE. The eNB is further configured to arrange the multiple scheduling requests in a queue in order of the priority values associated with the multiple scheduling requests.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof

What is claimed is:

1. A method for granting scheduling requests, the method comprising the steps of:
   receiving, by a non public safety wireless communications system, multiple scheduling requests from multiple mobile stations of a plurality of mobile stations, wherein each of the multiple scheduling requests indicates that a corresponding one of the multiple mobile stations is requesting uplink data transmission resources from a base station included in the non public safety wireless communications system;
   determining, by the non public safety wireless communications system, a priority value for each of the multiple scheduling requests based on multiple scoring criteria, resulting in a plurality of priority values associated with the multiple scheduling requests, wherein the multiple scoring criteria includes public safety activity information that is received by the non public safety wireless communications system from a public safety system; and
   transmitting, by the non public safety wireless communications system, one or more scheduling request grants to a subset of the multiple mobile stations, wherein the subset includes one or more mobile stations of the multiple mobile stations that are associated with one or more scheduling requests of the multiple scheduling requests having relatively high priority values of the plurality of priority values.

2. The method of claim 1, wherein the multiple scoring criteria also includes one or more additional criteria selected from a group consisting of an indication of quality of service between a mobile station and the base station; a mobile station transmit time interval; a known quantity of data to be transmitted by the mobile station; whether or not a mobile station periodically transmits a scheduling request; a channel quality indicator; and a reference signal received power indicator.

3. The method of claim 1, wherein the public safety activity information includes one or more public safety activity characteristics selected from a group consisting of a user role, a jurisdictional coverage area, an incident type, and an application type.

4. The method of claim 1, wherein determining the priority value comprises, for each of the multiple scheduling requests:
   determining a priority value for each criterion of the multiple scoring criteria, resulting in multiple priority values; and
   combining the multiple priority values to generate a total priority value, wherein the priority value for a scheduling request is related to the total priority value.

5. The method of claim 1, wherein determining the priority value further comprises, for each of the multiple scheduling requests:
   adjusting the priority value determined for a scheduling request based on a channel quality indicator from a mobile station associated with the scheduling request.

6. The method of claim 1, wherein determining the priority value further comprises, for each of the multiple scheduling requests:
   adjusting the priority value for a scheduling request from a mobile station based on a previously determined priority value determined for a previously received scheduling request from the mobile station.

7. The method of claim 1, further comprising:
   arranging the multiple scheduling requests in a queue in order of the priority values associated with the multiple scheduling requests.

8. The method of claim 7, wherein arranging the multiple scheduling requests in the queue comprises arranging the multiple scheduling requests in a multi-level queue.

9. The method of claim 7, wherein transmitting the one or more scheduling request grants comprises:
   determining whether resource blocks are available for scheduling;
   when the resource blocks are available, assigning the resource blocks to one or more highest priority scheduling requests in the queue; and
   transmitting the one or more scheduling request grants to one or more mobile stations associated with the one or more highest priority scheduling requests.

10. The method of claim 1, further comprising:
    receiving a buffer status report from a mobile station in response to transmitting a scheduling request grant to the mobile station;
    transmitting an uplink assignment to the mobile station in response to receiving the buffer status report; and
    receiving data from the mobile station in response to transmitting the uplink assignment.

11. A method for conveying data in a communication system, which implements a Third Generation Partnership Project (3GPP) Long Term Evolution (LTE) standard, and which includes an evolved NodeB (eNB) and a plurality of user equipments (UEs), the method performed by the eNB and comprising the steps of:
    receiving multiple scheduling requests from multiple UEs of the plurality of UEs, wherein each of the multiple scheduling requests indicates that a corresponding one of the multiple UEs is requesting uplink data transmission resources from the eNB;
    determining a priority value for each of the multiple scheduling requests based on scoring criteria that includes public safety activity information that is received by the eNB from a public safety system, resulting in a plurality of priority values associated with the multiple scheduling requests; and
    transmitting one or more scheduling request grants to a subset of the multiple UEs, wherein the subset includes one or more UEs of the multiple UEs that are associated with scheduling requests of the multiple scheduling requests having relatively high priority values of the plurality of priority values.

12. The method of claim 11, wherein the public safety activity information includes one or more public safety activity characteristics selected from a group consisting of a user role, a jurisdictional coverage area, an incident type, and an application type.

13. The method of claim 11, wherein the scoring criteria also includes one or more additional criteria selected from a group consisting of an indication of quality of service between a UE and the eNB; a UE transmit time interval; a known quantity of data to be transmitted by the UE; whether or not a UE periodically transmits a scheduling request; a channel quality indicator; and a reference signal received power indicator.

14. A communications system comprising:
    a base station configured to operate in a non public safety wireless communications system and further configured to:
       receive multiple scheduling requests from multiple mobile stations via the non public safety wireless communications system, wherein each of the multiple scheduling requests indicates that a corresponding one of the multiple mobile stations is requesting uplink data transmission resources from the base station, determine a priority value for each of the multiple scheduling requests based on multiple scoring criteria, resulting in a plurality of priority values associated with the multiple scheduling requests, wherein the multiple scoring criteria includes public safety activity information that is received by the non public safety wireless communications system from a public safety system, and transmit one or more scheduling request grants to a subset of the multiple mobile stations, wherein the subset includes one or more mobile stations of the multiple mobile stations that are associated with scheduling requests of the multiple scheduling requests having relatively high priority values of the plurality of priority values.

15. The system of claim 14, wherein the multiple scoring criteria also includes one or more additional criteria selected from a group consisting of an indication of quality of service between a mobile station and the base station; a mobile station transmit time interval; a known quantity of data to be transmitted by the mobile station; whether or not a mobile station periodically transmits a scheduling request; a channel quality indicator; and a reference signal received power indicator.

16. The system of claim 14, wherein the base station is an evolved NodeB (eNB) that is configured to implement a 3GPP Long Term Evolution (LTE) standard based on Orthogonal Frequency Division Multiplexing (OFDM).

17. The system of claim 14, the system further comprising:
a public safety system configured to communicate with the base station to transfer the public safety activity information; and
an interface between the public safety system and the base station configured to enable the base station to receive the public safety activity information from the public safety system.

18. The system of claim 14, wherein:
the base station is configured to determine the priority value for a scheduling request from a mobile station by
    determining a priority value for each criterion of the multiple scoring criteria, resulting in multiple priority values;
    combining the multiple priority values to generate a first intermediate priority value;
    adjusting the first intermediate priority value based on a channel quality indicator from the mobile station associated with the scheduling request, resulting in a second intermediate priority value; and
    adjusting the second intermediate priority value based on a previously determined priority value determined for a previously received scheduling request from the mobile station,
and wherein the base station is further configured to arrange the multiple scheduling requests in a queue in order of the priority values associated with the multiple scheduling requests.

* * * * *

UNITED STATES PATENT AND TRADEMARK OFFICE
CERTIFICATE OF CORRECTION

PATENT NO. : 8,897,237 B2  
APPLICATION NO. : 13/097765  
DATED : November 25, 2014  
INVENTOR(S) : Ningzhou Cui et al.

Page 1 of 1

It is certified that error appears in the above-identified patent and that said Letters Patent is hereby corrected as shown below:

IN THE SPECIFICATION:

In Column 5, Line 6, delete "radio 120," and insert -- radio 112, --, therefor.

In Column 12, Lines 61-67, delete "The relationship......................below:" and insert the same at Line 60, after "on).", as a continuation paragraph.

In Column 15, Lines 15-16, delete "combining" and insert -- combining. --, therefor.

In Column 20, Line 67, delete "thereof" and insert -- thereof. --, therefor.

Signed and Sealed this  
Tenth Day of May, 2016

Michelle K. Lee  
*Director of the United States Patent and Trademark Office*